US007977610B2

(12) United States Patent
Hamburger et al.

(10) Patent No.: US 7,977,610 B2
(45) Date of Patent: Jul. 12, 2011

(54) DEVICE FOR RECEIVING CERAMIC HEATING ELEMENTS AND METHOD FOR THE MANUFACTURE THEREOF

(75) Inventors: Andreas Hamburger, Germersheim (DE); Werner Faβbinder, Philippsburg (DE); Mike Riether, Herxheim (DE)

(73) Assignee: Borgwarner Beru Systems GmbH, Ludwigsburg (DE)

( * ) Notice: Subject to any disclaimer, the term of this patent is extended or adjusted under 35 U.S.C. 154(b) by 1055 days.

(21) Appl. No.: 10/821,863

(22) Filed: Apr. 12, 2004

(65) Prior Publication Data

US 2004/0200829 A1 Oct. 14, 2004

(30) Foreign Application Priority Data

Apr. 12, 2003 (DE) .................................. 203 05 936
Jul. 22, 2003 (DE) .................................. 103 33 451

(51) Int. Cl.

| | |
|---|---|
| ***H05B 3/06*** | (2006.01) |
| ***H05B 3/30*** | (2006.01) |
| ***H05B 3/50*** | (2006.01) |
| ***B60H 1/22*** | (2006.01) |
| ***F24H 3/00*** | (2006.01) |

(52) U.S. Cl. ........ 219/537; 219/504; 219/541; 219/542; 219/548

(58) Field of Classification Search .................. 219/230, 219/525, 538, 539, 540, 541, 544, 548, 553, 219/504, 202; 392/432, 485
See application file for complete search history.

(56) References Cited

U.S. PATENT DOCUMENTS

| | | | | |
|---|---|---|---|---|
| 3,356,462 | A * | 12/1967 | Cooke et. al. | 422/102 |
| 3,493,458 | A * | 2/1970 | Santangelo | 428/81 |
| 4,147,927 | A * | 4/1979 | Pirotte | 219/541 |
| 4,327,282 | A * | 4/1982 | Nauerth | 219/541 |
| 4,414,052 | A * | 11/1983 | Habata et al. | 156/273.7 |
| 4,426,573 | A * | 1/1984 | Fudickar et al. | 219/544 |
| 4,783,587 | A * | 11/1988 | Ishii et al. | 219/548 |
| 4,835,370 | A * | 5/1989 | Van Bokestal et al. | 219/544 |
| 4,884,683 | A * | 12/1989 | Ford | 206/163 |
| 4,948,953 | A | 8/1990 | Starck | |
| 4,990,748 | A * | 2/1991 | Starck | 392/485 |
| 5,192,853 | A * | 3/1993 | Yeh | 219/540 |
| 5,198,640 | A * | 3/1993 | Yang | 219/530 |
| 5,270,521 | A * | 12/1993 | Shikama et al. | 219/530 |
| 5,377,298 | A * | 12/1994 | Yang | 219/504 |
| 5,471,034 | A * | 11/1995 | Kawate et al. | 219/485 |
| 5,658,479 | A | 8/1997 | Tadokoro | |
| 5,665,261 | A * | 9/1997 | Damsohn et al. | 219/504 |
| 6,259,075 | B1 * | 7/2001 | Wu | 219/540 |

(Continued)

FOREIGN PATENT DOCUMENTS

DE 30 42 420 A1 6/1982

(Continued)

*Primary Examiner* — Joseph M Pelham

(74) *Attorney, Agent, or Firm* — Antonelli, Terry, Stout & Kraus, LLP.

(57) ABSTRACT

A device and a method for receiving ceramic heating elements (PTC elements, cold conductors) in a heating device, use an insulating frame and at least one contact plate held by the latter and on which the heating elements can be placed. The device is characterized in that the contact plate is frictionally held in the frame. The method is characterized in that at least on the contact plate side remote from the heating element reception side is moulded on or spread a layer of the following materials: plastic, polymer ceramic, ceramic.

30 Claims, 9 Drawing Sheets

U.S. PATENT DOCUMENTS

| | | | | |
|---|---|---|---|---|
| 6,373,705 | B1 * | 4/2002 | Koelle et al. | 361/720 |
| 6,472,645 | B1 * | 10/2002 | Bohlender | 219/505 |
| 7,361,868 | B2 * | 4/2008 | Otto et al. | 219/528 |

FOREIGN PATENT DOCUMENTS

| | | | |
|---|---|---|---|
| DE | 3902205 | | 8/1990 |
| DE | 201 21 116 | U1 | 4/2003 |
| FR | 2 826 711 | A1 | 1/2003 |
| FR | 2 826 829 | A1 | 1/2003 |
| FR | 2826829 | | 3/2003 |
| KR | 0 266 983 | B1 | 6/2000 |
| KR | 2001-112589 | A | 12/2001 |
| KR | 2003-19032 | A | 3/2003 |

* cited by examiner

DEVICE FOR RECEIVING CERAMIC HEATING ELEMENTS AND METHOD FOR THE MANUFACTURE THEREOF

FIELD OF THE INVENTION

The invention relates to a device for receiving ceramic heating elements (PTC elements, cold conductors) in a heating device, having an insulating frame and at least one contact plate held by said insulating frame and on which can be placed the heating elements. The invention also relates to a method for the manufacture of a device for receiving ceramic heating elements in a heating device.

BACKGROUND OF THE INVENTION

Such reception devices are used for receiving flat, parallelepipedic ceramic heating elements (PTC and cold conductor heating elements) for creating a heating device. Such a device has a frame in which is inserted a contact plate being positively held in the frame by a frame stud projecting through a contact plate opening, no frictional connection being provided. Besides longitudinal struts, the frame has crossbars extending perpendicular thereto and transversely over the contact plate. The ceramic heating elements are inserted between the crossbars on one side of the contact plate and are in this way received in the frame, whereas an insulating strip is placed on the contact plate side remote from the heating elements. The entire unit is slid into a profile or streamline tube having a rectangular cross-section and which is pressed for producing the complete heating device.

A particular disadvantage of the known reception device is that it is complicated and expensive to manufacture, because firstly the frame must be moulded, then the contact plate must be inserted and positively fixed therein. Thus, several components have to be handled in a number of individual steps during manufacture.

The problem of the invention is therefore to provide a reception device for the ceramic heating elements which, whilst avoiding the aforementioned disadvantages, can be more simply manufactured with fewer components and which is therefore less expensive, whilst the further manipulation thereof is also simpler.

SUMMARY OF THE INVENTION

According to the invention the set problem is solved with a device of the aforementioned type, which is characterized in that the contact plate and the frame are frictionally connected. In particular, the contact plate is frictionally held in the frame, but can also be held on the frame. Thus, in any case the contact plate and frame adhere to one another. The contact plate is made from an electrically conducting material such as steel or aluminium and the frame is made from electrically insulating material. The frictional connection between the contact plate and frame is such that it cannot be released by a person simply pulling it apart. An attempt to separate frame and contact plate will lead to the damage or destruction of the frame. The reception device according to the invention can in particular be manufactured in such a way that a contact plate is extrusion-coated by a frame frictionally receiving the same. Thus, the frictional connection occurs in the direction of the longitudinal extension of the thus connected parts.

In the case of a method according to the preamble, the invention also solves the set problem in that at least on a side of a contact plate remote from the reception side for the heating elements is sprayed or moulded a coating of the following materials: plastic, polymer ceramic and ceramic.

In an extremely preferred development of the inventive reception device, at least in a defined longitudinal portion of the frame, the contact plate is completely and tightly surrounded by the latter. The frictional retention of the contact plate in the frame is in particular brought about in said longitudinal portion of the frame part in which the contact plate is completely-surrounded by the frame material. With a limited thickness of the reception device and in particular the frame part, an all-round surrounding in tight manner of the contact plate can only be brought about by moulding in, because for moulding the frame without an inserted contact plate in this area it would be necessary to have a through frame channel, which would not be practicable in view of the limited contact plate thickness.

The inventive solution leads to a permanent connection between the frame and the contact plate and consequently permits an easy insertion of the device, together with the remaining elements such as ceramic heating elements and insulating support in an aluminium profile tube. The handling of components is reduced and manufacture is simpler and less costly.

In a preferred development of the inventive device, over most of its length, the contact plate is held in frame grooves formed in longitudinal struts.

In addition, the contact plate can additionally be positively held in the frame.

According to further preferred developments of the invention, on the contact plate side the frame has crossbars between which the heating elements can be inserted and in particular the longitudinal struts surrounding recesses receiving the heating elements and crossbars of the frame are constructed as inwardly directed studs for the positive retention of the heating elements.

According to a further development of the inventive device, on the frame, the bulges projecting over the narrow side for the frictional fixing of the frame are constructed in a profile tube.

According to other developments of the invention, the contact plate projects over the frame on at least one front side and in particular the contact plate projects over the frame precisely at one front side. In particular, the projecting end or ends of the contact plate are constructed as terminal lugs. For the axial fixing of the inventive reception device in a profile tube of a heating device, according to a preferred development of the invention the frame is provided on one front side with a hook projecting over the width.

Initially the frame can be constructed in such a way that it only embraces, with excess length, the narrow edges of the contact plate and on the contact plate side on which the heating elements are to be placed incorporates webs separating them from one another. In this case, the contact plate side remote from the heating elements is provided with an insulating covering in the form of a plate, before the frame, with the heating elements, is slid into a rectangular profile tube. The cover plate is made from an electrically insulating, but preferably also good heat conducting material, such as ceramic.

In a preferred alternative development, on a contact plate side remote from a reception side for the heating elements the frame is completely closed and consequently the contact plate is provided with a covering completely covering the same.

The frame can be made from one of the following materials or a union of at least two of these materials: plastic, polymer plastic, moulded on ceramic.

Polymer ceramics are inorganic-organic composite materials, which comprise ceramic fillers and a matrix of ceramic polymers.

In the case of a union of two of the aforementioned materials, the side of the contact plate remote from the reception side for the heating elements is covered by a covering layer of polymer ceramic or ceramic, whilst the rest of the frame is made from plastic or polymer ceramic.

The invention also relates to a device for receiving ceramic heating elements in a heating device with a contact plate and with holding elements for the lateral holding of the heating elements so as to prevent slipping on the contact plate, which is characterized by at least one insulating layer applied to a reception side for the contact plate side remote from the heating elements. The insulating layer is non-positively and therefore adhesively connected to the holding plate. Whilst fundamentally also in this variant the holding elements can be formed by an insulating frame, in an extremely preferred development of this inventive device, the holding elements are formed by projections pressed out of the contact plate plane. The projections can have a roll-like construction or can be constituted by lugs pressed out of the contact plate plane.

According to a further development, the insulating layer is made from one of the following materials or a union of at least two of these: plastic, polymer ceramic, moulded-on ceramic.

Whilst plastic and polymer ceramic can be applied in an injection moulding process, in that the contact plate is introduced into a mould and is held therein and the remaining mould cavity adapted to the desired frame is filled by injection moulding with plastic or ceramic, the application of ceramic preferably takes place by spraying or moulding-on, preferably by an atmospheric plasma spraying process. It is particularly advantageous to spray a ceramic coating on the contact plate side remote from the reception side for the heating elements, then to introduce this union of contact plate and sprayed-on ceramic insulating layer into an injection mould and to form the remaining frame in the injection moulding process from plastic or polymer ceramic. However, it is also possible to surround the contact plate not only on the side remote from the heating element to be received, but also in the marginal area or in a complete manner by spraying on ceramic and optionally to carry out reworking by chip-removing machining.

The invention also relates to a heating device with an electrically conductive profile tube, a holding device with one of the aforementioned constructions according to the invention and insertable into the same accompanied by the reception of ceramic heating elements in the recesses between the longitudinal struts and crossbars and whilst providing an insulating strip on the contact plate side remote from the heating elements, together with a radiator having several heating devices of this type kept parallel by holding webs and spaced from one another. As a function of the particular design variant, the insulating strip on the contact plate side remote from the reception side can be separately applied or connected non-positively thereto.

According to preferred developments of the inventive method, prior to the application of the insulating layer, projections are pressed out of the contact plate plane towards the side receiving the heating elements and that as holding elements for the heating elements a frame non-positively receiving the contact plate is applied by injection-moulding around or spraying on or round the contact plate thereon.

BRIEF DESCRIPTION OF THE DRAWINGS

Further features and advantages of the invention can be gathered from the following description of an embodiment of the invention, the claims and the attached drawings, wherein show:

DETAILED DESCRIPTION OF THE DRAWINGS

Figure 5:
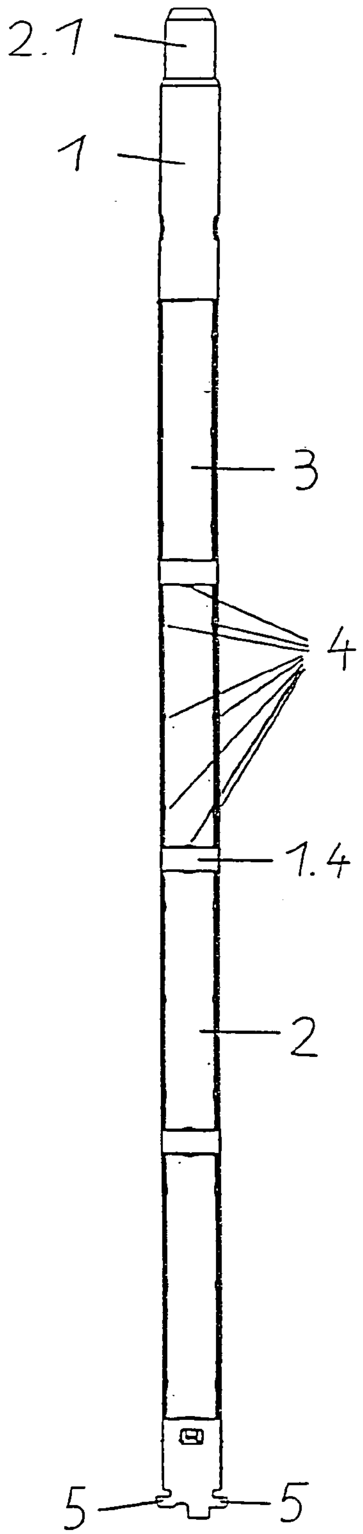
FIG. 5 A plan view of the side of the inventive reception device visible in FIG. 1.
Figure 6:
FIG. 6 A longitudinal section through an inventive reception device.
Figure 7:
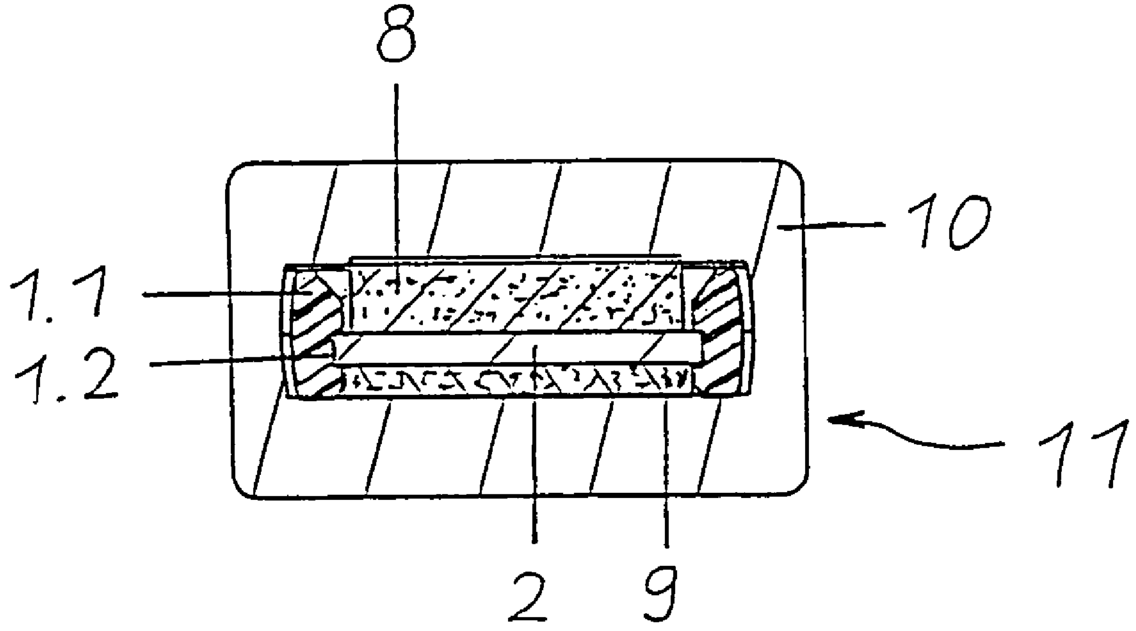
FIG. 7 A cross-section through an inventive heating device.

FIGS. 1 to 6 are different views of a device according to the invention for receiving ceramic heating elements within the frame of a heating device according to the invention and as shown in FIG. 7.

A device for receiving ceramic heating elements or reception device for short, firstly has a frame 1, which is preferably made from plastic, but optionally also from polymer ceramic or ceramic and which is therefore electrically insulating. In the case of a plastic or polymer ceramic frame 1, a contact plate 2 is moulded in the same and is consequently frictionally or non-positively held in the frame 1 with high force. In the case of a ceramic material, the contact plate is appropriately sprayed round with the same and optionally there can be reworking operations by chip-removing machining. In all cases the frame and contact plate adhere to one another. It is not possible to draw the contact plate 2 out of the frame 1, unless use was made of mechanical aids, but then the frame would be damaged or destroyed.

Figure 3:
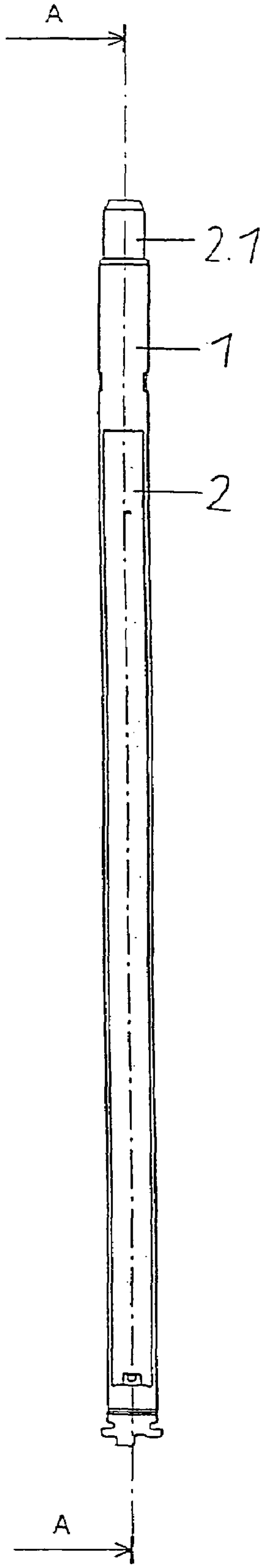
FIG. 3 A plan view on the side of an inventive reception device visible in FIG. 2.
Figure 4:
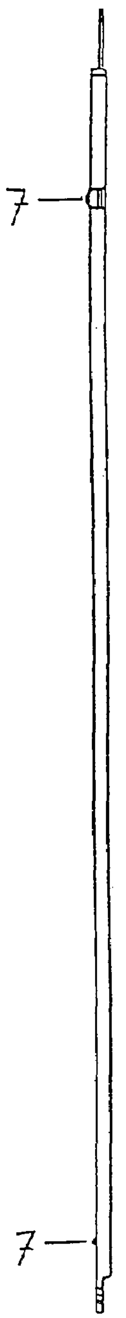
FIG. 4 A side view of the inventive holding device.

Over its greatest length, the frame 1 only has parallel longitudinal struts 1.1, which have inwardly directed longitudinal grooves 1.2. Over most of its length the contact plate 2 is held in the grooves 1.2 of the struts 1.1. In a short length portion 1.3, whose length is less than the frame and contact plate length, over all cross-sections the contact plate 2 is completely surrounded by frame material, the force of the frictional connection between frame 1 and contact plate 2 essentially occurring in this area. When the frame thickness is less than 2 mm and the contact plate thickness is approximately 0.5 mm, the frame coating on the side of the longitudinal portion 1.3 visible in FIG. 3 is approximately also 0.5 mm and on the side remote in FIG. 3 and visible in FIG. 1 is approximately 1 mm.

Laterally in the sequence of the longitudinal struts 1.1, arcuate bulges 7 are provided on the frame 1 in the vicinity of the longitudinal portion 1.3 and by means of these the frame is initially fixed by clamping in an aluminium profile tube (FIG. 7) for fitting purposes.

Figure 1:
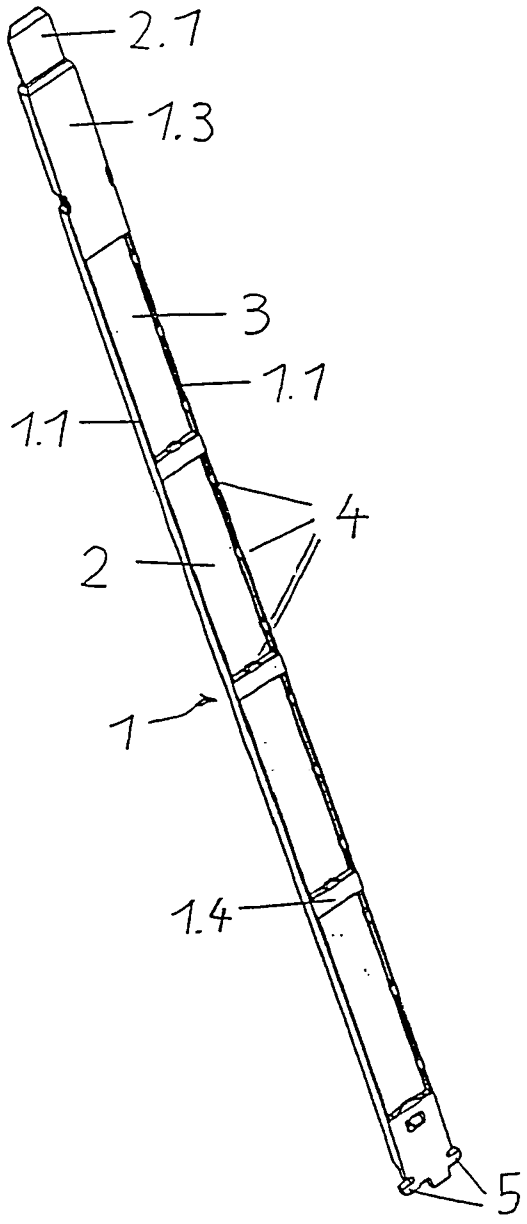
FIG. 1 A first perspective view of a reception device according to the invention.
Figure 2:
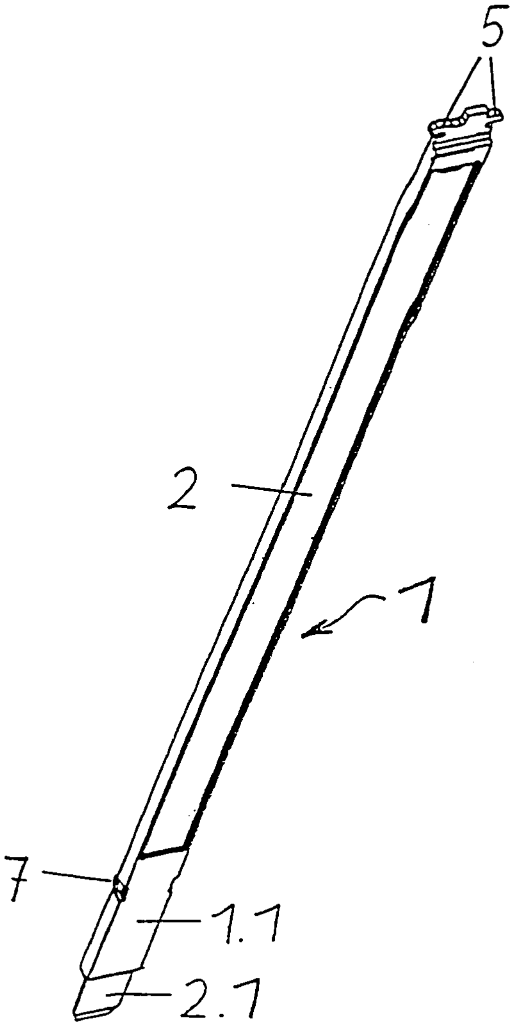
FIG. 2 Another perspective view of the holding device according to the invention.

As can in particular be gathered from FIGS. 1, 5 and 6, on the side visible in FIGS. 1 and 5, the longitudinal struts are linked by longitudinally spaced crossbars 1.4.

Towards the inside of the longitudinal struts 1.1 and crossbars 1.4 are provided inwardly directed studs 4, which serve to receive ceramic heating elements (PTC and cold conductor elements) to be inserted in recesses surrounded by the struts and crossbars.

In addition, on one front end of the frame 1 are provided hooks 5 projecting over its substantially constant cross-section over its entire length and which come to rest on the front side of a profile tube in which the holding device is held for forming a heating device and in this way bound the end position during the sliding of the reception device into such a profile tube. On the side remote from the hooks 5, the contact plate 2 projects over the holding frame with a terminal lug 2.1.

By means of the reception device according to the invention, as described hereinbefore with reference to FIGS. 1 to 6, a heating device, as shown in cross-section in FIG. 7, is obtained in such a way that ceramic heating elements 8 are inserted in recesses 3 between the struts 1.1 and crossbars 1.4 of the holding frame and are frictionally retained in the recesses 3 by the studs 4. An insulating strip 9 is held against the contact plate 2 from the side of frame 1 remote from the recesses 3 (from the side visible in FIGS. 2 and 3). The complete arrangement is inserted in a profile tube 10 having a rectangular cross-section. The latter is then pressed from the flat sides against the described arrangement inserted therein, which is consequently also frictionally held in the profile tube 10. The front sides of the profile tube 10 can be closed with plaster. The terminal lugs 2.1 of contact plates 2 project out of the profile tube 10.

Figure 8:
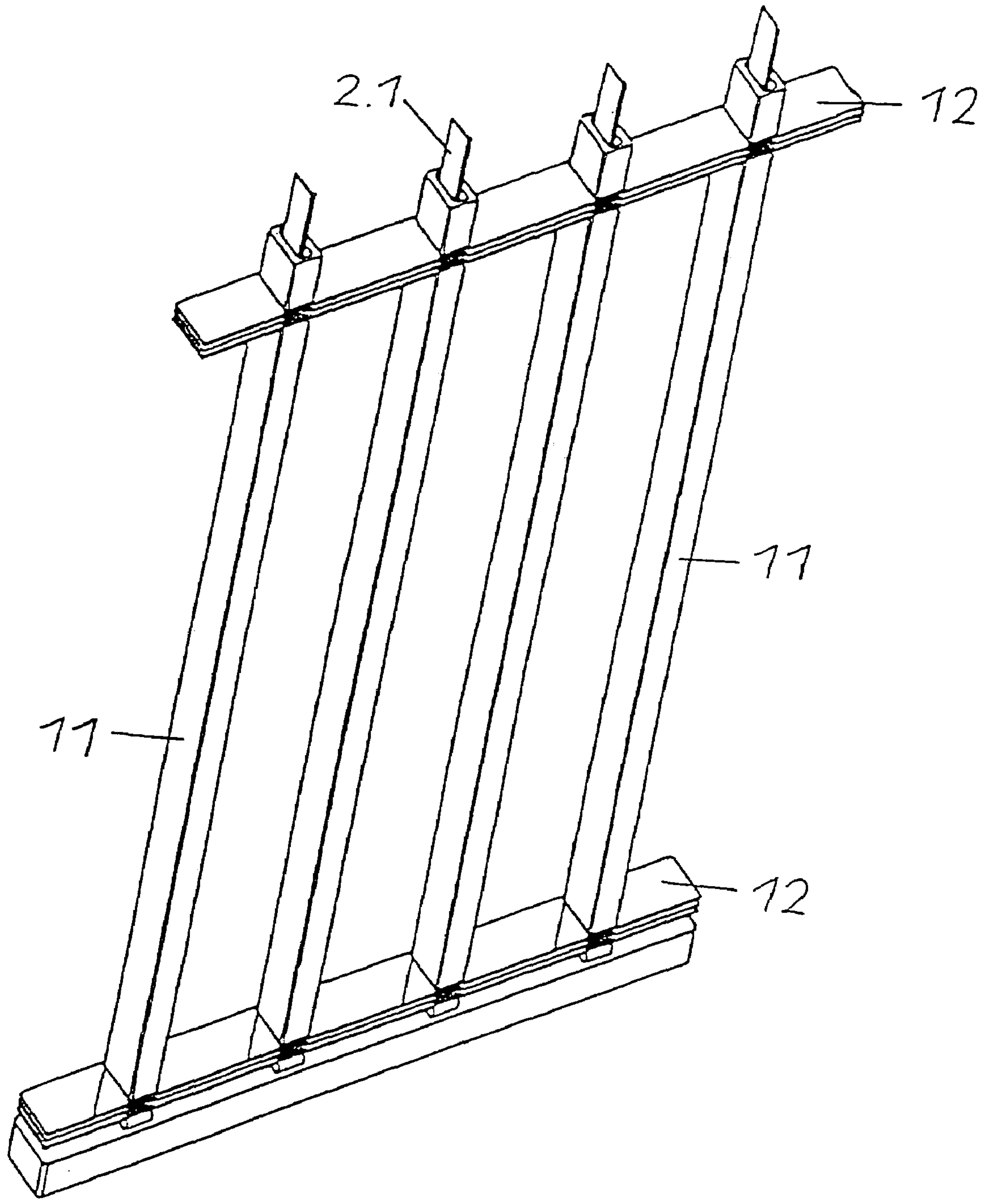
FIG. 8 A perspective view of a radiator formed from heating devices of FIG. 7 having the reception device according to the invention.
Figure 9A:
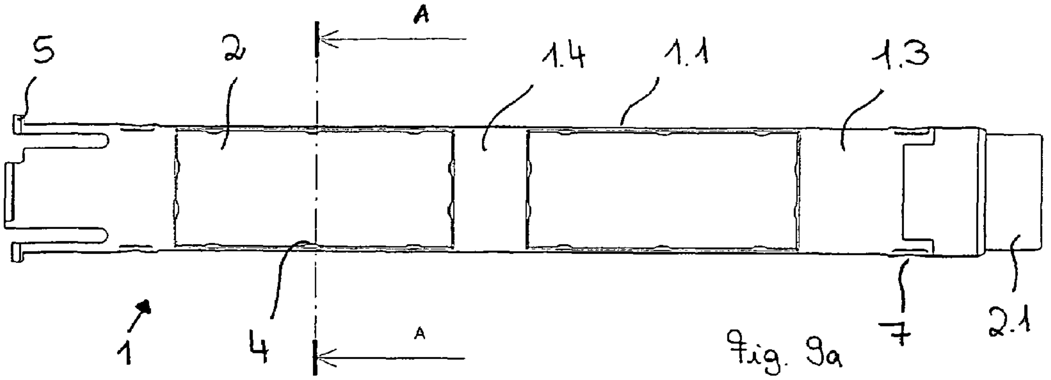
FIGS. 9*a-d* Views of another embodiment of an inventive device for receiving ceramic heating elements.
Figure 9B:
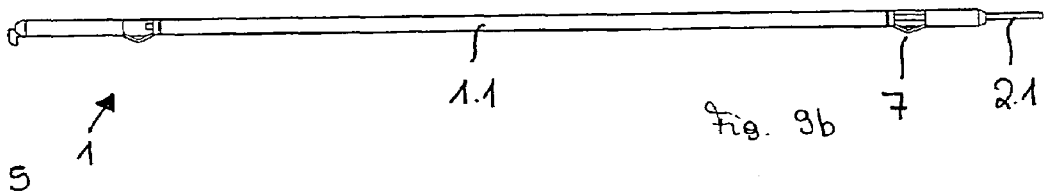
Figure 9C:
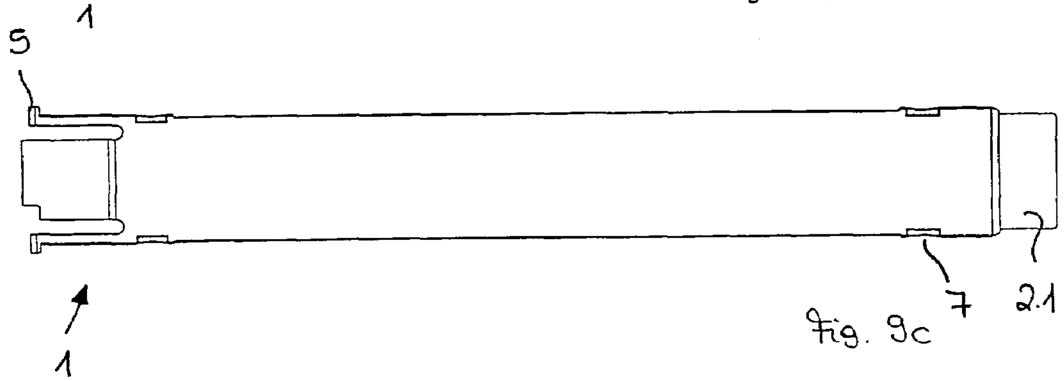
Figure 9D:
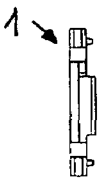
Figure 9E:
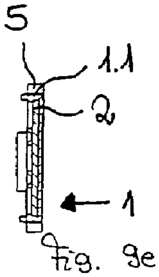
FIG. 9*e* A section along A-A of FIG. 9*a* of said embodiment.

Individual heating devices formed in this way can be inserted in a radiator, as shown in FIG. 8. Several individual heating elements 11 are held in spaced, parallel, clamping manner in openings of retaining webs in the form of heat conducting lamellae 12. By means of a heating device and/or a radiator it is possible to heat liquids, fluids and air.

Figure 10:
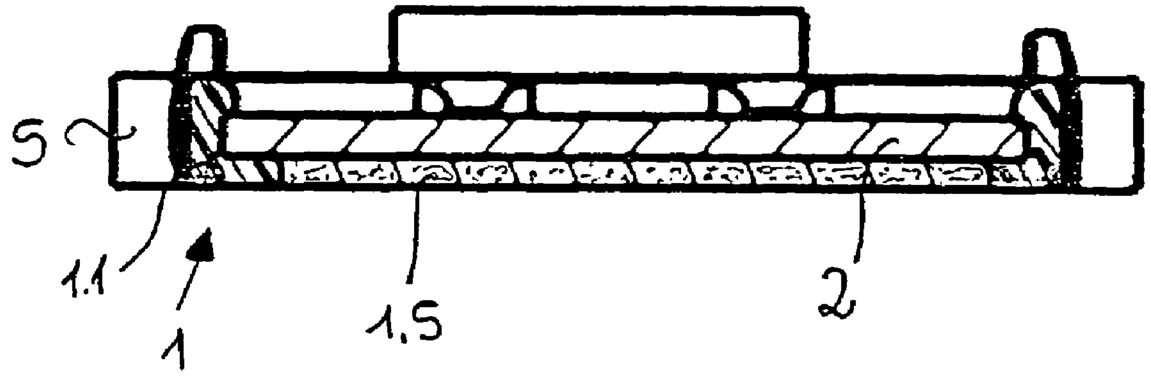
FIG. 10 A sectional view corresponding to FIG. 9*e* for a further variant of the inventive device.

Whereas in the embodiments of FIGS. 1 to 5 a frame 1 is shown in which the side of the contact plate 2 remote from the reception side for the heating elements is not covered and is instead covered later prior to the production of the heater through a separate insulating plate, FIGS. 9 and 10 show variants in which said (under)side of the contact plate is directly frictionally and adhesively covered by the frame. Identical parts are given the same reference numerals. FIGS. 9*c* and 9*e* in particular make it clear that in the variant of FIG. 9 the frame not only surrounds the contact plate at the edges or narrow sides thereof, but here also covers in one piece said (under)side of the contact plate.

As stated, this can take place in an injection moulding process in which the frame, as shown in FIG. 9, is completely moulded in in a single step. Whilst here fundamentally plastic can be used, the preferred material is polymer ceramic, because it has a better thermal conductivity than plastic.

The cross-sectional view of FIG. 10 shows a composite frame 1, where the underside or the side of the contact plate 2 remote from the support side for the heating elements is given a separate layer. It is preferably a ceramic layer, which has been sprayed on by atmospheric plasma spraying or APS. However, it can also be a polymer ceramic layer. The remaining frame, which essentially has the same contour as the frame of FIGS. 1 to 5, is made from plastic or polymer ceramic, (if the lower cover 1.5 is made from ceramic) and is subsequently applied using an injection moulding process.

Figure 11A:
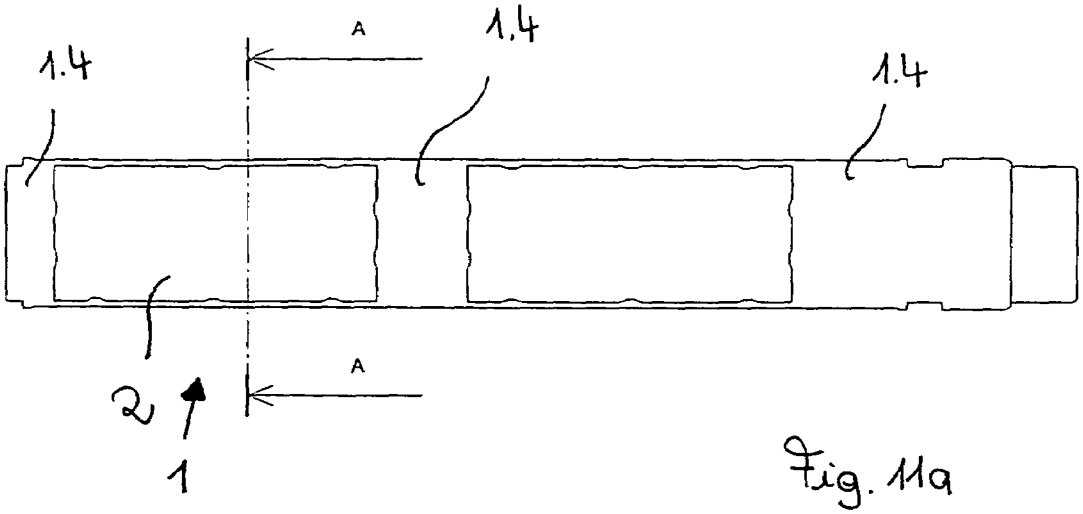
FIGS. 11*a,b* Views of a further variant of the inventive device.
Figure 11B:
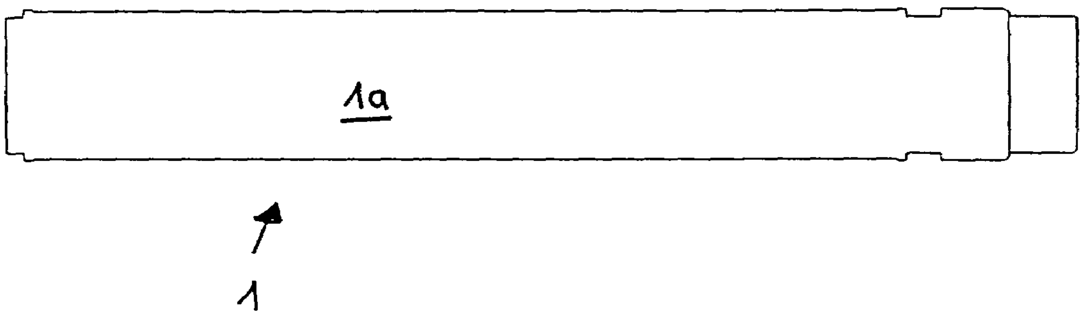
Figure 12A:
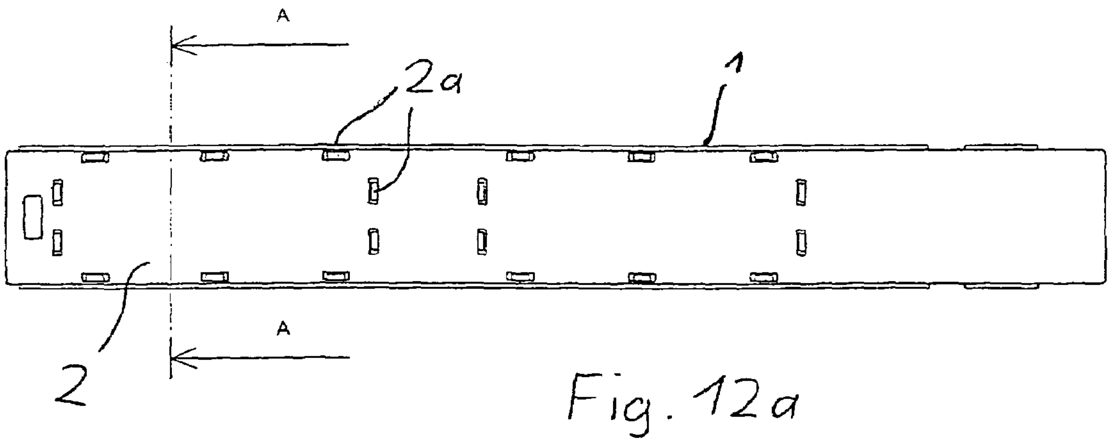
FIGS. 12*a-c* Views of a preferred development of the inventive device with a ceramic coating on one side.
Figure 12B:
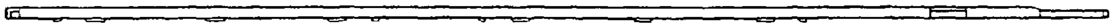
Figure 12C:
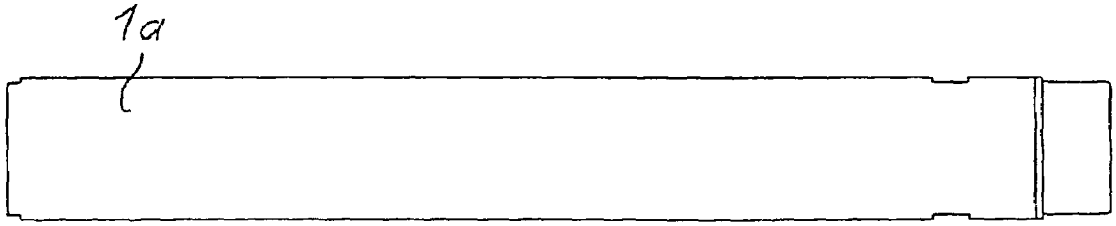

The variants of FIGS. 11 and 12 are suitable for the use of ceramic material as the insulating material, although in principle polymer ceramic and optionally also plastic can be used.

In the variant of FIGS. 11*a* and 11*b* there is a planar contact plate 2 with a frame 1, which completely covers said contact plate 2 on the underside by means of a cover layer 1*a* (underside=the side remote from the heating element reception side).

On the side remote from the cover layer 1*a*, the frame once again has crossbars 1.4, which are relatively wide in accordance with the material preferably used. For the same reason the fine structure is simplified and there are e.g. no lugs 5, as in the variant of FIG. 9. Optionally shapes can be produced by reworking by machining.

In the variant of FIG. 12 an insulating layer 1*a*, preferably of ceramic, but optionally also of polymer ceramic or plastic is only applied to the underside of the contact plate 2. A lateral retention of the PTC elements to be placed on the other side of the contact plate 2 so as to prevent slipping is brought about by projections 2*a*, which are formed from outward stampings from the contact plate 2, e.g. in the form of bulges, arcs or pressed out lug elements. Additionally edges are covered with insulating material 1 corresponding to the variant of FIG. 11, including a projection or excess length on the side of the contact plate 2 receiving the heating elements.

The invention claimed is:

1. A device for receiving PTC elements in a heating device, having an insulating frame having parallel, spaced longitudinal struts and longitudinally spaced crossbars linking the longitudinal struts, and at least one electrically conductive contact plate held in said insulating frame and on which can be placed the PTC elements, the longitudinal struts and longitudinally spaced crossbars surrounding recesses for receiving the PTC elements, wherein the contact plate is molded in the frame and, at least in a limited longitudinal portion of the frame, the contact plate is completely and tightly surrounded by the frame such that the at least one electrically conductive contact plate cannot be drawn out of the insulating frame without damaging the insulating frame, wherein the contact plate projects past the frame at at least one end of the frame, wherein the frame is made from at least one material selected from the group consisting of plastic, polymer ceramic, wherein, over most of its length, the contact plate is held in grooves of the frame formed in longitudinal struts, and wherein on its side remote from the reception side for the PTC elements, the contact plate is covered by a polymer ceramic or ceramic cover layer, whilst the rest of the frame is made from plastic or polymer ceramic.

2. Device according to claim 1, wherein the contact plate is additionally positively held in frame.

3. Device according to claim 1, wherein the projecting end or ends of the contact plate are constructed as terminal lugs.

4. Device according to claim 1, wherein the frame is made from at least one material selected from the group consisting of plastic, polymer ceramic, and moulded-on ceramic.

5. Device according to claim 4, wherein on a side of the contact plate remote from a reception side for the PTC elements, the frame is completely closed and consequently the contact plate is provided with a covering completely covering the same.

6. Device according to claim 4, wherein on its side remote from the reception side for the PTC elements, the contact plate is covered by a polymer ceramic or ceramic cover layer, whilst the rest of the frame is made from plastic or polymer ceramic.

7. Device according to claim 1, wherein bulges, projecting over at least one side of the frame are constructed on the frame for frictionally holding the frame in a profile tube.

8. A device for receiving PTC elements in a heating device, comprising:

an insulating frame having parallel, spaced longitudinal struts extending in a longitudinal direction of the insulating frame and longitudinally spaced crossbars extending perpendicularly to the longitudinal struts and linking the longitudinal struts, wherein the longitudinal struts and longitudinally spaced crossbars define and surround spaced recesses in the insulating frame in which PTC elements can be held; and at least one electrically conductive contact plate held in the insulating frame on which PTC elements provided in the recesses of the insulating frame can be placed, the at least one electrically conductive contact plate having opposed first and second major surfaces and opposed longitudinally extending narrow sides joining the opposed first and second major surfaces;

wherein the longitudinal struts of the insulating frame completely and tightly surround most of the length of the longitudinally extending narrow sides of the at least one electrically conductive contact plate such that the at least one electrically conductive contact plate cannot be drawn out of the insulating frame without damaging the insulating frame.

9. Device according to claim 8, wherein the projecting end or ends of the contact plate are constructed as terminal lugs.

10. Device according to claim 8, wherein the frame is made from at least one material selected from the group consisting of plastic, polymer ceramic, and moulded-on ceramic.

11. Device according to claim 10, wherein on its side remote from the reception side for the PTC element, the contact plate is covered by a polymer ceramic or ceramic cover layer, whilst the rest of the frame is made from plastic or polymer ceramic.

12. Device according to claim 8, wherein bulges, projecting over at least one side of the frame are constructed on the frame for frictionally holding the frame in a profile tube.

13. A device for receiving PTC elements in a heating device, comprising:

an insulating frame having parallel, spaced longitudinal struts extending in a longitudinal direction of the insulating frame and longitudinally spaced crossbars extending perpendicularly to the longitudinal struts and linking the longitudinal struts, wherein the longitudinal struts and longitudinally spaced crossbars define and surround spaced recesses in the insulating frame in which PTC elements can be held; and at least one electrically conductive contact plate held in the insulating frame on which PTC elements provided in the recesses of the insulating frame can be placed, the at least one electrically conductive contact plate having longitudinally extending side edges;

wherein the longitudinal struts of the insulating frame completely and tightly surround most of the length of at least one of the longitudinally extending side edges of the at least one electrically conductive contact plate and wherein the at least one electrically conductive contact plate cannot be drawn out of the insulating frame without damaging the insulating frame.

14. Device according to claim 13, wherein the projecting end or ends of the contact plate are constructed as terminal lugs.

15. Device according to claim 13, wherein the frame is made from at least one material selected from the group consisting of plastic, polymer ceramic, and moulded-on ceramic.

16. Device according to claim 15, where on its side remote from the reception side for the PTC element, the contact plate is covered by a polymer ceramic or ceramic cover layer, whilst the rest of the frame is made from plastic or polymer ceramic.

17. Device according to claim 13, wherein bulges, projecting over at least one side of the frame are constructed on the frame for frictionally holding the frame in a profile tube.

18. A device for receiving PTC elements in a heating device, comprising:

an insulating frame having parallel, spaced longitudinal struts extending in a longitudinal direction of the insulating frame and longitudinally spaced crossbars extending perpendicularly to the longitudinal struts and linking the longitudinal struts, wherein the longitudinal struts and longitudinally spaced crossbars define and surround spaced recesses in the insulating frame in which PTC elements can be held; and at least one electrically conductive contact plate held in the insulating frame molded around the contact plate on which PTC elements provided in the recesses of the insulating frame can be placed, the at least one electrically conductive contact plate having opposed first and second major surfaces and opposed longitudinally extending narrow sides joining the opposed first and second major surfaces;

wherein the longitudinal struts of the insulating frame completely and tightly cover most of the length of the longitudinally extending narrow sides of the at least one electrically conductive contact plate and wherein the at least one electrically conductive contact plate cannot be drawn out of the insulating frame without damaging the insulating frame.

19. Device according to claim 18, wherein the projecting end or ends of the contact plate are constructed as terminal lugs.

20. Device according to claim 18, wherein the frame is made from at least one material selected from the group consisting of plastic, polymer ceramic, and moulded-on ceramic.

21. Device according to claim 20, wherein on its side remote from the reception side for the PTC element, the contact plate is covered by a polymer ceramic or ceramic cover layer, whilst the rest of the frame is made from plastic or polymer ceramic.

22. A device for receiving PTC elements in a heating device, comprising:

an insulating frame having parallel, spaced longitudinal struts extending in a longitudinal direction of the insulating frame and longitudinally spaced crossbars extending perpendicularly to the longitudinal struts and linking the longitudinal struts, wherein the longitudinal struts and longitudinally spaced crossbars define and surround spaced recesses in the insulating frame in which PTC elements can be held; and at least one electrically conductive contact plate held in the insulating frame molded around the contact plate on which PTC elements provided in the recesses of the insulating frame can be placed, the at least one electrically conductive contact plate having longitudinally extending side edges;

wherein the longitudinal struts of the insulating frame completely and tightly surround most of the length of at least one of the longitudinally extending side edges of the at least one electrically conductive contact plate and wherein the at least one electrically conductive contact plate cannot be drawn out of the insulating frame without damaging the insulating frame.

23. Device according to claim 22, wherein the projecting end or ends of the contact plate are constructed as terminal lugs.

24. Device according to claim 22, wherein the frame is made from at least one material selected from the group consisting of plastic, polymer ceramic, and moulded-on ceramic.

25. Device according to claim 24, wherein on its side remote from the reception side for the PTC element, the contact plate is covered by a polymer ceramic or ceramic cover layer, whilst the rest of the frame is made form plastic or polymer ceramic.

26. Device according to claim 22, wherein bulges, projecting over at least one side of the frame are constructed on the frame for frictionally holding the frame in a profile tube.

27. A device for receiving PTC elements in a heating device, comprising:

an insulating frame having parallel, spaced longitudinal struts extending in a longitudinal direction of the insulating frame and longitudinally spaced crossbars extending perpendicularly to the longitudinal struts and linking the longitudinal struts, wherein the longitudinal struts and longitudinally spaced crossbars define and surround spaced recesses in the insulating frame in which PTC elements can be held; and at least one electrically conductive contact plate held in the insulating frame molded around the contact plate on which PTC elements provided in the recesses of the insulating frame can be placed, the at least one electrically conductive contact plate having opposed first and second major surfaces and opposed longitudinally extending narrow sides joining the opposed first and second major surfaces;

wherein the longitudinal struts of the insulating frame completely and tightly cover most of the length of the longitudinally extending narrow sides of the at least one electrically conductive contact plate, wherein the at least one electrically conductive contact plate cannot be drawn out of the insulating frame without damaging the insulating frame, and wherein the sides of the longitudinal struts and/or of crossbars facing the spaced recesses are provided with bulges for frictionally retaining the PTC elements inserted in the recesses.

28. Device according to claim 27, wherein the projecting end or ends of the contact plate are constructed as terminal lugs.

29. Device according to claim 27, wherein the frame is made from at least one material selected from the group consisting of plastic, polymer ceramic, and moulded-on ceramic.

30. Device according to claim 29, wherein on its side remote from the reception side for the PTC element, the contact plate is covered by a polymer ceramic or ceramic cover layer, whilst the rest of the frame is made from plastic or polymer ceramic.

* * * * *